(12) United States Patent
Suzuki et al.

(10) Patent No.: US 8,922,681 B2
(45) Date of Patent: Dec. 30, 2014

(54) IMAGE PROCESSING DEVICE THAT PERFORMS IMAGE PROCESSING TO CORRECT TARGET PIXELS IN A REGION SURROUNDING A DEFECTIVE PIXEL

(75) Inventors: Hiroshi Suzuki, Tokyo (JP); Motoyuki Kashiwagi, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 201 days.

(21) Appl. No.: 13/608,197

(22) Filed: Sep. 10, 2012

(65) Prior Publication Data

US 2013/0070128 A1    Mar. 21, 2013

(30) Foreign Application Priority Data

Sep. 20, 2011  (JP) ................. 2011-205074

(51) Int. Cl.
*H04N 9/64*    (2006.01)
*H04N 5/367*   (2011.01)

(52) U.S. Cl.
CPC .................... *H04N 5/367* (2013.01)
USPC ........................... 348/246; 348/244

(58) Field of Classification Search
CPC . H04N 5/2171; H04N 5/2176; H04N 5/2178; H04N 5/367; H04N 5/3675
USPC ......... 348/207.99, 221.1, 241, 243, 246, 247, 348/244; 250/559.41, 559.45, 559.46; 382/149; 358/3.26
See application file for complete search history.

(56) References Cited

U.S. PATENT DOCUMENTS

| 5,854,655 | A | 12/1998 | Watanabe et al. |
| 8,134,616 | B2 | 3/2012 | Shimoozono et al. |
| 8,237,824 | B1 * | 8/2012 | Linzer ........................... 348/243 |
| 8,477,988 | B2 | 7/2013 | Itoh |
| 2006/0017826 | A1 | 1/2006 | Sekimoto et al. |
| 2008/0012967 | A1 * | 1/2008 | Kuwabara ..................... 348/246 |
| 2008/0100728 | A1 | 5/2008 | Nagata |
| 2008/0122925 | A1 | 5/2008 | Sekimoto et al. |

FOREIGN PATENT DOCUMENTS

| JP | 2000-101925 A | 4/2000 | |
| JP | 2000101925 A | * 4/2000 | ............. H04N 5/335 |
| JP | 2005-354730 A | 12/2005 | |
| JP | 2006-026234 A | 2/2006 | |

(Continued)

OTHER PUBLICATIONS

Japanese Office Action dated Feb. 12, 2014 (and English translation thereof) in counterpart Japanese Application No. 2011-205074.

(Continued)

*Primary Examiner* — Dennis Hogue
(74) *Attorney, Agent, or Firm* — Holtz, Hotlz, Goodman & Chick PC (57) ABSTRACT

A digital camera (1) includes: an imaging unit (16) having an imaging element that includes a plurality of pixels, and generates a pixel value for each of the plurality of pixels as image data; a position specification unit (53) that specifies a position of a defective pixel among the plurality of pixels, in the image data generated by the imaging unit (16); a region specification unit (54) that specifies a region in the image data in which image noise occurs due to the defective pixel, based on the position specified by the position specification unit (53); and a correction unit (55) that corrects a pixel value of each of a plurality of pixels included in the region in the image data specified by the region specification unit (54), based on a weighted average of pixels values of a plurality of pixels located at a periphery of the region.

9 Claims, 6 Drawing Sheets

(56) References Cited

FOREIGN PATENT DOCUMENTS

| | | | |
|---|---|---|---|
| JP | 2007-129339 A | | 5/2007 |
| JP | 2007129339 A | * | 5/2007 |
| JP | 2007-174124 A | | 7/2007 |
| JP | 2008-109504 A | | 5/2008 |
| KR | 100392579 B1 | | 7/2003 |
| KR | 10-2010-0032279 A | | 3/2010 |
| KR | 100986203 B1 | | 10/2010 |

OTHER PUBLICATIONS

Korean Office Action dated Sep. 25, 2013 (and English translation thereof) in counterpart Korean Application No. 10-2012-0103702.
Japanese Office Action dated Nov. 12, 2013 (and English translation thereof) in counterpart Japanese Application No. 2011-205074.
"Korean Office Action dated Mar. 24, 2014 in counterpart Korean Application No. 10-2012-0103702".

* cited by examiner

IMAGE PROCESSING DEVICE THAT PERFORMS IMAGE PROCESSING TO CORRECT TARGET PIXELS IN A REGION SURROUNDING A DEFECTIVE PIXEL

This application is based on and claims the benefit of priority from Japanese Patent Application No. 2011-205074, filed on 20 Sep. 2011, the content of which is incorporated herein by reference.

BACKGROUND OF THE INVENTION

1. Field of the Invention

The present invention relates to an image processing device, an image processing method and a recording medium.

2. Related Art

In digital cameras, portable telephones having an image capture function, and the like, the light incident from a lens is converted to electrical signals by way of an imaging elements CMOS (Complementary Metal Oxide Semiconductor) or CCD (Charge Coupled Device) type, and these electrical signals are outputted as image data.

The aforementioned imaging elements photoelectrically convert incident light and accumulate charge, and have a plurality of pixels that determine the brightness based on the amount of accumulated charge. In this plurality of pixels, there is a possibility for white defects to occur in which a charge is accumulated that exceeds the amount according to the incident light.

Japanese Unexamined Patent Application, Publication No. 2000-101925 discloses a method of specifying in advance a pixel in CCD adopting imaging elements at which a white defect is occurring, and correcting a pixel value (image signal) corresponding to this pixel based on the pixel values (image signal) corresponding to before and after pixels.

However, in CMOS-type imaging elements, there is a possibility for blooming to occur in which the white defect expands to pixels arranged in a peripheral region to the pixel at which the white defect occurs.

FIGS. 6A to F are diagrams illustrating blooming. In FIGS. 6A to F, one square box indicates one pixel. The color of each pixel indicates the amount of charge, meaning that a pixel approaches white as charge is being accumulated.

Figure 6A:
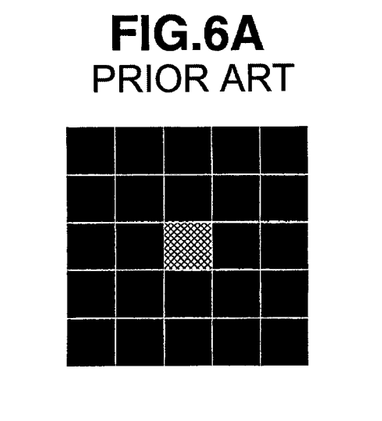
FIGS. 6A to F are graphs illustrating blooming.
Figure 6B:
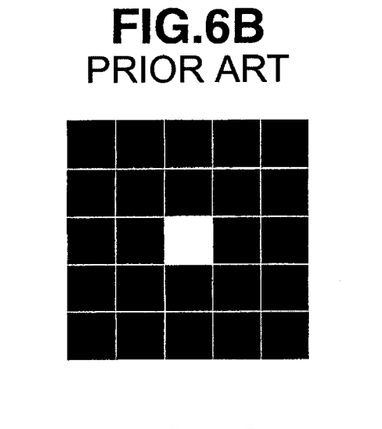
Figure 6C:
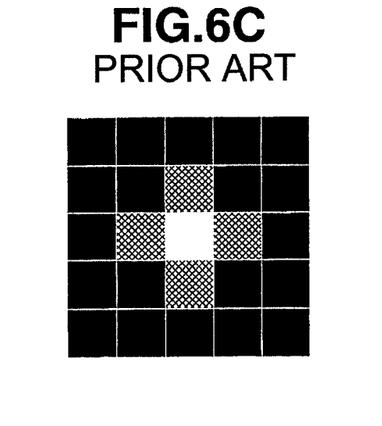
Figure 6D:
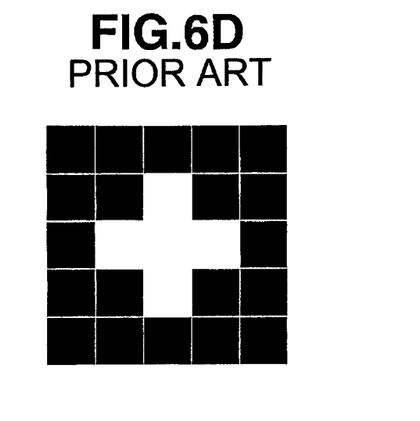
Figure 6E:
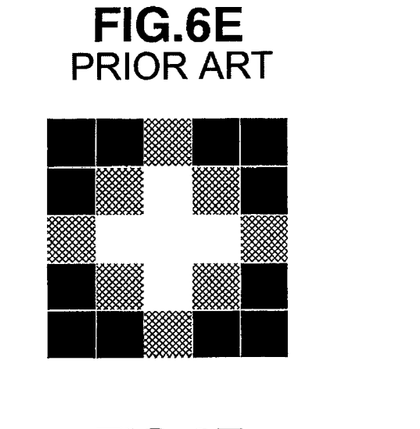
Figure 6F:
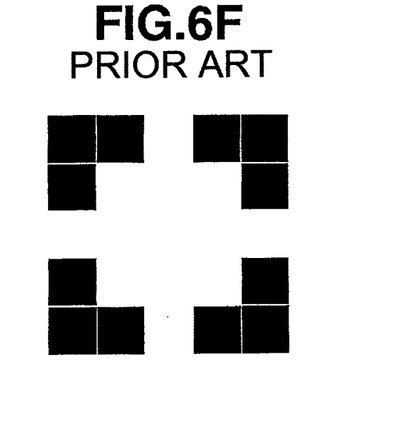

First, in FIG. 6A, a white defect occurs in one pixel (pixel in the center of the figure). At the initial occurrence, the amount of charge accumulated more than necessary is small, and the degree of the white defect is low. However, due to environmental changes such as temperature and humidity or ageing, when the amount of charge accumulated more than necessary increases and reaches the permitted value (FIG. 6B), the charge will leak out to adjacent pixels, and a charge will accumulated more than necessary also in the adjacent pixels (FIG. 6C). Thereafter, the charge being leaked to adjacent pixels from the pixels at which a charge more than necessary has accumulated in this way occurs like a chain reaction, and the white defect grows (FIGS. 6D to F).

In order to correct the white defect occurring due to blooming, for example, a digital camera or the like repeats an image capturing action two times consecutively. In other words, the digital camera or the like captures a normal subject in a first image capturing action, and captures in a darkened state in the second image capturing action. The digital camera or the like specifies the pixel at which a charge has accumulated in the results of such a second image capturing action as a pixel in which a white defect has occurred. Then, in the image data captured in the first image capturing action, the digital camera or the like performs correction of the pixel value (image signal) of the pixel specified in this way. However, the method disclosed in Japanese Unexamined Patent Application, Publication No. 2000-101925 corrects the pixel value of the pixel at which the white defect is occurring based on the pixel value before and after; therefore, there has been concern over the correction result being unnatural.

In addition, there has been concern over the overall photography time taking too long, if a second photography action is made to specify the pixel at which the white defect occurs during photography in order to raise the accuracy in specifying the pixel in which a white defect occurs.

As a result, an image processing device and image processing method have been desired that can correct accurately and effectively correct pixel values in image data (image signals).

SUMMARY OF THE INVENTION

According to one aspect of the present invention, an image processing device the performs image processing includes:

an imaging unit that has an imaging element including a plurality of pixels, and that generates a pixel value for each of the plurality of pixels as image data;

a position specification unit that specifies a position of a defective pixel among the plurality of pixels, in the image data generated by the imaging unit;

a region specification unit that specifies a region in the image data in which image noise occurs due to the defective pixel, based on the position specified by the position specification unit; and a correction unit that corrects a pixel value of each of a plurality of pixels included in the region in the image data specified by the region specification unit, based on a weighted average of pixels values of a plurality of pixels located at a periphery of the region.

In addition, according to another aspect of the present invention, in an image processing method executed by an image processing device having an imaging element including a plurality of pixels, the method includes the steps of:

generating, as image data, a pixel value of each of the plurality of pixels;

specifying a position of a defective pixel among the plurality of pixels, in the image data generated in the step of generating;

specifying a region in the image data in which image noise occurs due to the defective pixel, based on the position specified in the step of specifying a position; and correcting a pixel value of each of the plurality of pixels included in the region of the image data specified in the step of specifying a region, based on a weighted average of pixel values of a plurality of pixels located at a periphery of the region.

Furthermore, according to yet another aspect of the present invention, a computer readable recording medium is encoded with a program that causes a computer of an image processing device having an imaging element including a plurality of pixels to execute the steps of:

generating, as image data, a pixel value of each of the plurality of pixels;

specifying a position of a defective pixel among the plurality of pixels, in the image data generated in the step of generating;

specifying a region in the image data in which image noise occurs due to the defective pixel, based on the position specified in the step of specifying a position; and correcting a pixel value of each of the plurality of pixels included in the region of the image data specified in the step of specifying a region, based on a weighted average of pixel values of a plurality of pixels located at a periphery of the region.

DETAILED DESCRIPTION OF THE INVENTION

Hereinafter, an embodiment relating to the present invention will be explained while referencing the drawings.

Figure 1:
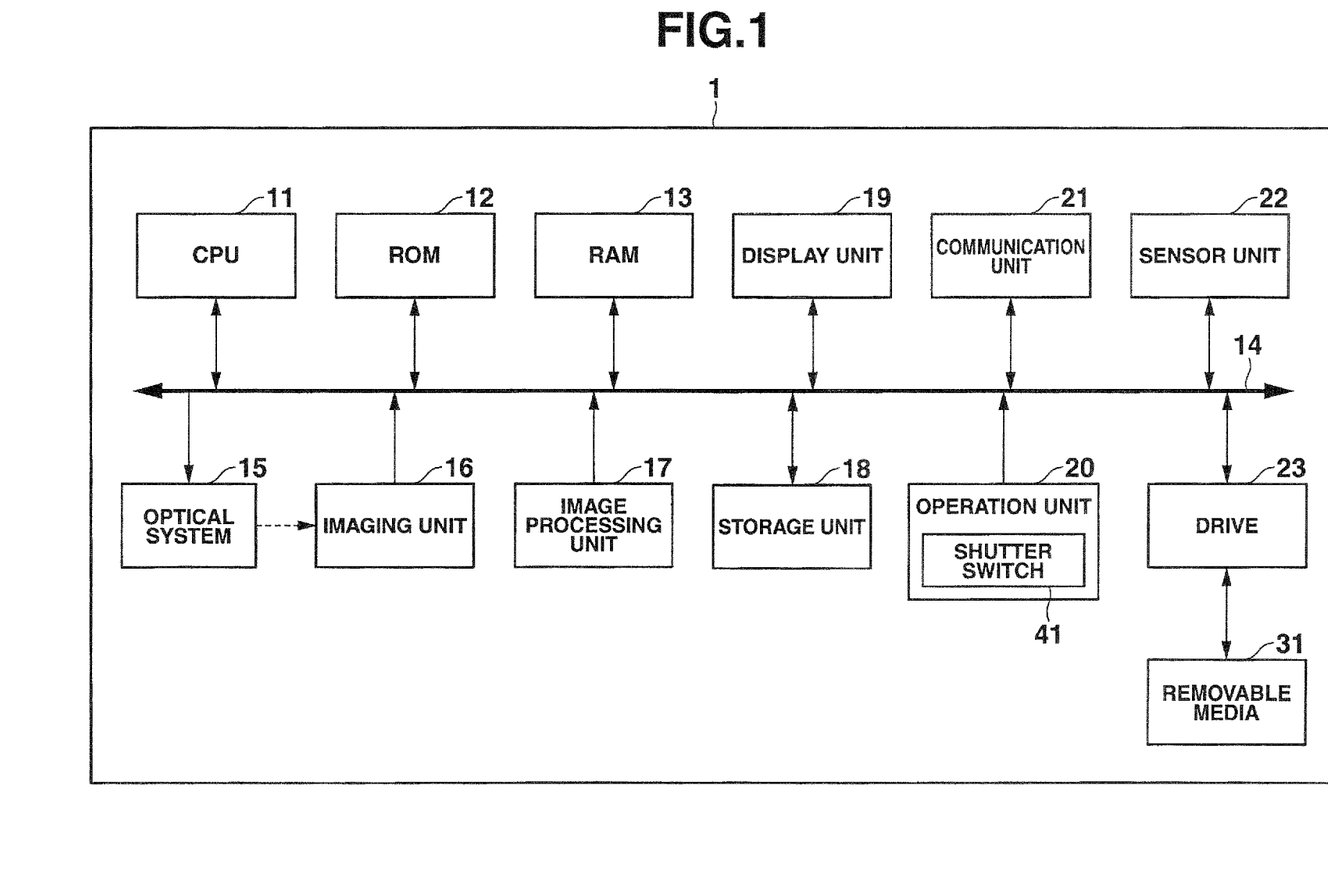
FIG. 1 is a block diagram showing a hardware configuration of a digital camera as an embodiment of an image capturing device according to the present invention.

FIG. 1 shows a hardware configuration diagram for a digital camera 1 as an embodiment of an image signal processing device according to the present invention.

Referring to FIG. 1, the digital camera 1 includes a CPU (Central Processing Unit) 11, ROM (Read Only Memory) 12, RAM (Random Access Memory) 13, a bus 14, an optical system 15, an imaging unit 16, an image processing unit 17, a storage unit 18, a display unit 19, an operation unit 20, a communication unit 21, a sensor unit 22, and a drive 23.

The CPU 11 executes various processing in accordance with programs recorded in the ROM 12, or programs loaded from the storage unit 18 into the RAM 13. In addition to programs for the CPU 11 to execute various processing, the ROM 12 stores the necessary data and the like upon the CPU 11 executing various processing, as appropriate.

For example, programs for realizing the respective functions of the image controller 51 to the correction unit 55 in FIG. 2 described later are stored in the ROM 12 and storage unit 18 in the present embodiment. Therefore, the CPU 11 can realize the respective functions of the image controller 51 to the correction unit 55 in FIG. 2 described later, by executing the processing in accordance with these programs, and cooperating as appropriate with the image processing unit 17 described later.

The CPU 11, ROM 12 and RAM 13 are connected to each other via the bus 14. The optical system 15, imaging unit 16, image processing unit 17, storage unit 18, display unit 19, operation unit 20, communication unit 21, sensor unit 22 and drive 23 are also connected to this bus 14.

The optical system 15 is configured so as to include a lens that condenses light in order to capture an image of a subject, e.g., a focus lens, zoom lens, etc. The focus lens is a lens that causes a subject image to form on the light receiving surface of imaging elements of the imaging unit 16. The zoom lens is a lens that causes the focal length to freely change in a certain range. Peripheral devices that adjust the focus, exposure, etc. can also be provided to the optical system 15 as necessary.

The imaging unit 16 is configured from a plurality of imaging elements, AFE (Analog Front End), etc., and generates image data containing pixels obtained from the plurality of imaging elements. In the present embodiment, the imaging elements are configured from photoelectric transducers of CMOS (Complementary Metal Oxide Semiconductor) sensor-type. A color filter such as a Bayer array is installed on the imaging elements. Every fixed time period, the imaging elements photoelectrically convert (capture) an optical signal of an incident and accumulated subject image during this period during this period, and sequentially supply the analog electric signals obtained as a result thereof to the AFE.

The AFE conducts various signal processing such as A/D (Analog/Digital) conversion processing on these analog electric signals, and outputs the digital signals obtained as a result thereof as output signals of the imaging unit 16. It should be noted that the output signal of the imaging unit 16 will be referred to as "image data" hereinafter. Therefore, the image data is outputted from the imaging unit 16, and supplied as appropriate to the image processing unit 17, etc. In the present embodiment, a unit of image data outputted from the imaging unit 16 is image data of an aggregate of pixel values (image signals) of each pixel constituting the imaging elements, i.e. of a frame or the like constituting one static image or dynamic image.

The image processing unit 17 is configured from a DSP (Digital Signal Processor), VRAM (Video Random Access Memory), etc.

In addition to image processing such as noise reduction and white balance on image data input from the imaging unit 16, the image processing unit 17 conducts various image processing required in the realization of the respective functions of the image acquisition unit 52 to the correction unit 55 described later, in cooperation with the CPU 11. The image processing unit 17 causes image data on which various image processing has been conducted to be stored in the storage unit 18 or removable media 31.

The storage unit 18 is configured by DRAM (Dynamic Random Access Memory), etc., and temporarily stores image data outputted from the image processing unit 17. In addition, the storage unit 18 also stores various data and the like required in various image processing.

The display unit 19 is configured as a flat display panel consisting of an LCD (Liquid Crystal Device) and LCD driver, for example. The display unit 19 displays images representative of the image data supplied from the storage unit 18 or the like.

Although not illustrated, the operation unit 20 has a plurality of switches in addition to the shutter switch 41, such as a power switch, photography mode switch and playback switch. When a predetermined switch among this plurality of switches is subjected to a pressing operation, the operation unit 20 supplies a command assigned for the predetermined switch to the CPU 11.

The communication unit 21 controls communication with other devices (not illustrated) via a network including the Internet.

The sensor unit 22 measures the ambient temperature of the imaging elements of the imaging unit 16, and provides the measurement result to the CPU 11.

The removable media 31 made from a magnetic disk, optical disk, magneto-optical disk, semiconductor memory, or the like is installed in the drive 23 as appropriate. Then, programs read from the removable media 31 are installed in the storage unit 18 as necessary. In addition, similarly to the storage unit 18, the removable media 31 can also store various data such as the image data stored in the storage unit 18.

Figure 2:
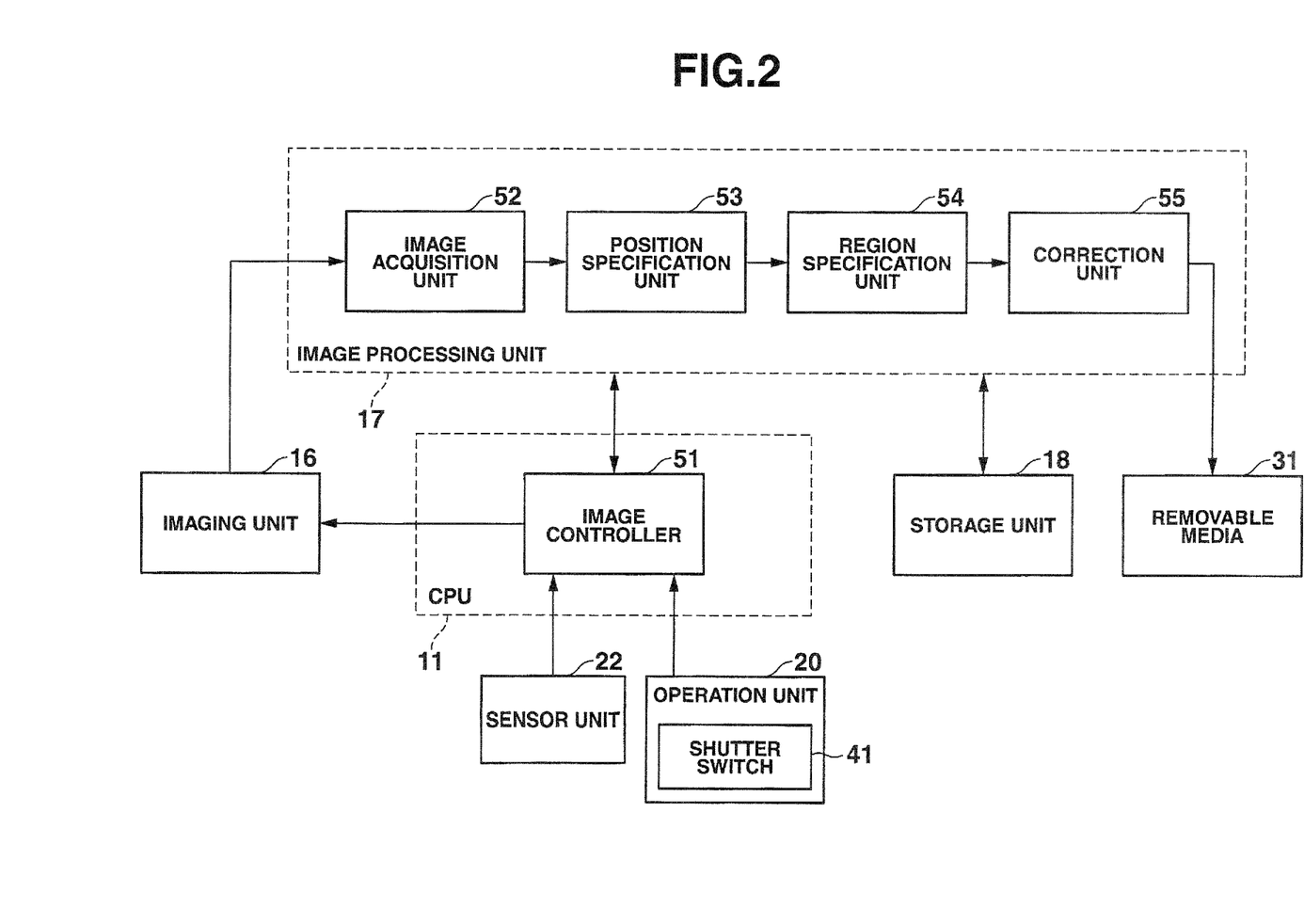
FIG. 2 is a functional block diagram showing a functional configuration for the digital camera of FIG. 1 to execute image capture processing.

FIG. 2 is a functional block diagram showing a functional configuration for executing a sequence of processing (hereinafter referred to as "image capture processing"), among the processing executed by the digital camera 1 of FIG. 1, from capturing an image of a subject until recording image data of the captured image obtained as a result thereof in the removable media 31.

As shown in FIG. 2, in a case of image capture processing being executed, the imaging controller 51 functions in the CPU 11, and the image acquisition unit 52, position specification unit 53, region specification unit 54 and correction unit 55 function in the image processing unit 17. It should be noted that the functions of the image controller 51 do not particularly need to be built into the CPU 11 as in the present embodiment, and the functions can also be assigned to the image processing unit 17. Conversely, the respective functions of the image acquisition unit 52 to the correction unit 55 do not particularly need to be built into the image processing unit 17 as in the present embodiment, and at least a part of these functions can also be assigned to the CPU 11.

The image controller 51 controls the overall execution of image capture processing.

Herein, with the imaging elements of the imaging unit 16, defective pixels may occur due to damage or the like at a stage during production, for example. Then, at a position corresponding to the defective pixel, a charge greater than necessary will accumulate, thereby causing image noise (white defect) to occur in which the position corresponding to the defective pixel is displayed as whitening. Furthermore, there is a possibility for blooming (refer to FIGS. 6A to F) to occur in which the image noise expands to the pixels adjacent to the defective pixel due to environmental changes such as the temperature and humidity and ageing in imaging elements configured from CMOS-type photoelectric conversion elements.

As a result, in the digital camera 1 according to the present embodiment, the image acquisition unit 52 to the correction unit 55 execute the following such processing under the control of the image controller 51.

Figure 3:
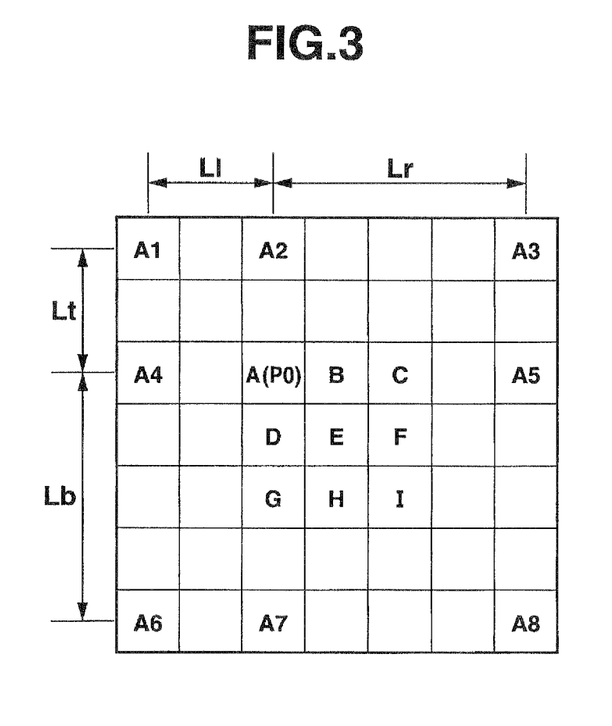
FIG. 3 is a graph illustrating the correction of a region in which image noise occurs due to a defective pixel in image data.

FIG. 3 is a graph illustrating the correction of a region in which image noise occurs in the image data due to a defective pixel. It should be noted that FIG. 3 is a graph in which a plurality of pixels are arranged in a box grid. Hereinafter, the processing of the image acquisition unit 52 to the correction unit 55 will be explained while referencing FIG. 3.

The image acquisition unit 52 receives an acquisition command issued from the image controller 51, acquires image data generated and outputted from the imaging unit 16, and causes the acquired image data to be stored in the VRAM.

The position specification unit 53 specifies the position, in the image data generated by the imaging unit 16 and stored in the VRAM, of at least one defective pixel included in the imaging elements. The position of the defective pixel is stored in list format in the storage unit 18 as a defective pixel position list. In other words, the position information of the defective pixels in the image data is stored in advance in the storage unit 18. For example, in FIG. 3, the position of a defective pixel is specified as a position E by the position specification unit 53.

The region specification unit 54 specifies a region in which image noise occurs in the image data due to a defective pixel, based on the position specified by the position specification unit 53. More specifically, via the image controller 51, the region specification unit 54 acquires an ambient temperature of the imaging elements of the imaging unit 16 measured in the sensor unit 22 and an exposure time when image capturing in the imaging unit 16. Then, the region specification unit 54 sets the acquired ambient temperature of the imaging elements and the exposure time as the state during image data generation by the imaging unit 16. Next, the region specification unit 54 specifies the size of the region in which image noise occurs, based on the position specified by the position specification unit 53 and the state during generation of the image data by the imaging unit 16. For example, in FIG. 3, position A to position I centered around position E of a defective pixel are specified by the region specification unit 54 as the region in which image noise occurs.

It should be noted that it may be configured so that the size of the region corresponding to the ambient temperature of the imaging elements and exposure time is made to be stored in advance in the storage unit 18 as a correspondence table, and the region specification unit 54 specifies the size of a region corresponding to a combination of the ambient temperature of the imaging elements and the exposure time based on this correspondence table. It addition, the region specification unit 54 may fix the size of a region in which image noise occurs as a fixed size in advance.

It should be noted that a region specified by the region specification unit 54 will be referred to hereinafter as correction target region.

The correction unit 55 corrects pixels values of a plurality of pixels included in the correction target region, based on the pixel values of a plurality of pixels located at the periphery of the correction target region.

More specifically, the correction unit 55 specifies a plurality of pixels located at the periphery of the correction target region, by selecting pixels located in a predetermined range from the position specified by the position specification unit 53.

Next, the correction unit 55 selects, for each of the plurality of pixels included in the correction target region, pixels to be used in the correction of pixel values, from among the plurality of pixels located at the periphery of the correction target region, depending on the position of each of the pixels to be a correction target.

Herein, the correction unit 55 preferably uniformly selects pixels to be used in the correction of pixel values from a plurality of pixels located at the periphery of the correction target region. In addition, the correction unit 55 preferably selects pixels of a similar color as the pixel of the correction target from the plurality of pixels located at the periphery of the region. For example, in FIG. 3, in a case of the pixels corresponding to position A, position A1 to position A8, being colors of red, pixels corresponding to position A1 to position A8 will be selected as the pixels to be used in the correction of the pixel at position A.

Next, the correction unit 55 sequentially sets each of the plurality of pixels included in the correction target region to pixels to be given attention as the target of processing (hereinafter referred to as "attention pixel"), and for the pixel value of an attention pixel, performs correction based on a weighted average of pixel values of the pixels selected from the plurality of pixels located at the periphery of the correction target region. Herein, the correction unit 55 preferably causes the weight of each of the pixel values of the plurality of pixels to be used in correction to vary in the weighted average, depending on the position of each of the plurality of pixels included in the correction target region.

For example, in FIG. 3, when the pixels of position A1 to position A8 are being selected as the pixels to be used in correction in the case of the pixel of position A being set as the attention pixel, the correction unit 55 increases the weighting value more as the distance relative to the position A decreases to calculate the weighted average.

More specifically, the correction unit 55 corrects the pixel value of the attention pixel at position A in accordance with the following formula (1), for example.

$$VA=(VA1\times6+VA2\times12+VA3\times4+VA4\times12+VA5\times6+VA6\times4+VA7\times6+VA8\times3)\div(6+12+4+12+6+4+6+3) \quad (1)$$

In formula (1), VA indicates the pixel value of the attention pixel at the position A after correction, and VA1 to VA8 respectively indicate the pixel values at position A1 to position A8. In addition, the weighting for each of the pixel values VA1 to VA8 is set based on the inverse of the additional value of the distance in the horizontal direction and the distance in the vertical direction from the position A of the attention pixel.

When generalizing formula (1), it is rewritten as the following formula (2).

$$VP0=\{Va1\div(Lt+Ll)+Va2\div Lt+Va3\div(Lt+Lr)+VA4\div Ll+VA5\div Lr+Va6\div(Lb+Ll)+VA7\div Lb+VA8\div(Lb+Lr)\}\div Lall \quad (2)$$

Formula (2) is a formula that obtains the corrected pixel value VP0 of an attention pixel P0 located at the coordinates (x+1, y+1), in a case of blooming occurring at a peripheral N pixel centered around a pixel P located at the coordinates (x,y), i.e. in a case of the correction target region having the size of (2N+1)×(2N+1).

In formula (2), Vn (n indicating any among positions A1 to A8) indicates the pixel value at position n.

Herein, position A1 is separated from the position of the attention pixel P0 by the distance Lt above in the vertical direction, and separated by the distance Ll to the left in the horizontal direction.

The position A2 is separated from the position of the attention pixel P0 by the distance Lt above in the vertical direction.

The position A3 is separated from the position of the attention pixel P0 by the distance Lt above in the vertical direction, and separated by the distance Lr to the right in the horizontal direction.

The position A4 is separated from the position of the attention pixel P0 by the distance Ll to the left in the horizontal direction.

The position A5 is separated from the position of the attention pixel P0 by the distance Lr to the right in the horizontal direction.

The position A6 is separated from the position of the attention pixel P0 by the distance Lb below in the vertical direction, and separated by the distance Ll to the left in the horizontal direction.

The position A7 is separated from the position of the attention pixel P0 by the distance Lb below in the vertical direction.

The position A8 is separated from the position of the attention pixel P0 by the distance Lb below in the vertical direction, and separated by the distance Lr to the right in the horizontal direction.

Herein, in a case of the imaging element being a Bayer array, it is defined as a=2, and in the case of not being a Bayer array, if it is defined as a=1, for example, the length Lt is Nt+j+a, the length Lb is N−j+a, the length Ll is N+i+a, and the length Lr is N−i+a.

In addition, Lall in formula (2) is expressed as the following formula (3).

$$Lall=\{1/(Lt+Ll)+1/Lt+1/(Lt+Lr)+1/Ll+1/Lr+1/(Lb+Ll)+1/Lb+1/(Lb+Lr)\} \quad (3)$$

It should be noted that the weighting of the weighted average is not particularly limited to the aforementioned example, and will be sufficient so long as being weighting based on the distance from the attention pixel.

For example, in the case of the state shown in FIG. 3, when setting the length of a side of one box to 1, the distance relative to the position A of the attention pixel will be 2 for position A2 and position A4, 2.8 for position A1, 4 for positions A5 and A7, 4.5 for position A3 and position A6, and 5.7 for position A8. Therefore, the correction unit 55 increases the weighting for positions A2 and A4 having the closest distance to the position A, and decreases the weighting for position A8 having the farthest distance to the position A.

In addition, in the aforementioned example, only a part of the pixels present at the positions A1 to A8 are used as the pixels to be used in correction among the peripheral pixels of the correction target region. However, this is an exemplification, and it is possible to use any number of pixels at any position among the peripheral pixels of the correction target region, as the pixels to be used in correction. Understandably, all of the peripheral pixels of the correction target region can be used as pixels to be used in correction.

In addition, although the correction unit 55 has been configured to perform correction of the pixel values in the correction target region based on the weighted average of a plurality of pixel values, it is not limited thereto, and it may be configured so as to perform correction defining the pixel value that is an intermediate value of the plurality of pixels used in correction as the pixel value. In this case, the correction unit 55 performs Fourier transform of the pixel values of a plurality of pixels included in the correction target region, and calculates the spatial frequency of the correction target region. Then, in a case of the spatial frequency thus calculated being lower than a predetermined value, the correction unit 55 sets each of the pixel values of the plurality of pixels included in the correction target region sequentially to the attention pixel, and performs correction so as to make the intermediate value of the pixel values of the plurality of pixels to be used in correction (each pixel of positions A1 to A8 in the example of FIG. 3) the pixel value of the attention pixel. In a case of the spatial frequency being low, it is possible to perform more appropriate correction by performing correction according to a median filter.

In other words, generally, in the case of many pixels being present at the periphery of a defective pixel and having a pixel value close to the correct pixel value of this defective pixel, by using the intermediate value according to the median filter, it becomes possible to correct the pixel value of a defective pixel to a pixel value close to the correct pixel value, without blurring the image (while keeping the edge of the image).

However, the range of the peripheral pixels used in correction also widens if the correction target region widens, and particularly in the case of the spatial frequency being high, the probability of a pixel having a pixel value close to the correct pixel value of the defective pixel is low, and the median filter will no longer effectively work; therefore, using the median filter is effective only in cases of the spatial frequency being low.

In addition, the correction unit 55 may be configured so as to acquire the ambient temperature of the imaging elements of the imaging unit 16 measured at the sensor unit 22, and the exposure time when image capturing in the imaging unit 16, via the image controller 51, and to control whether or not to perform correction based on the acquired ambient temperature of the imaging elements and exposure time.

The functional configuration of the digital camera 1 to which the present invention is applied has been explained in the foregoing while referencing FIGS. 2 and 3. Next, image capture processing executed by the digital camera 1 having such a functional configuration will be explained while referencing FIGS. 4 and 5.

Figure 4:
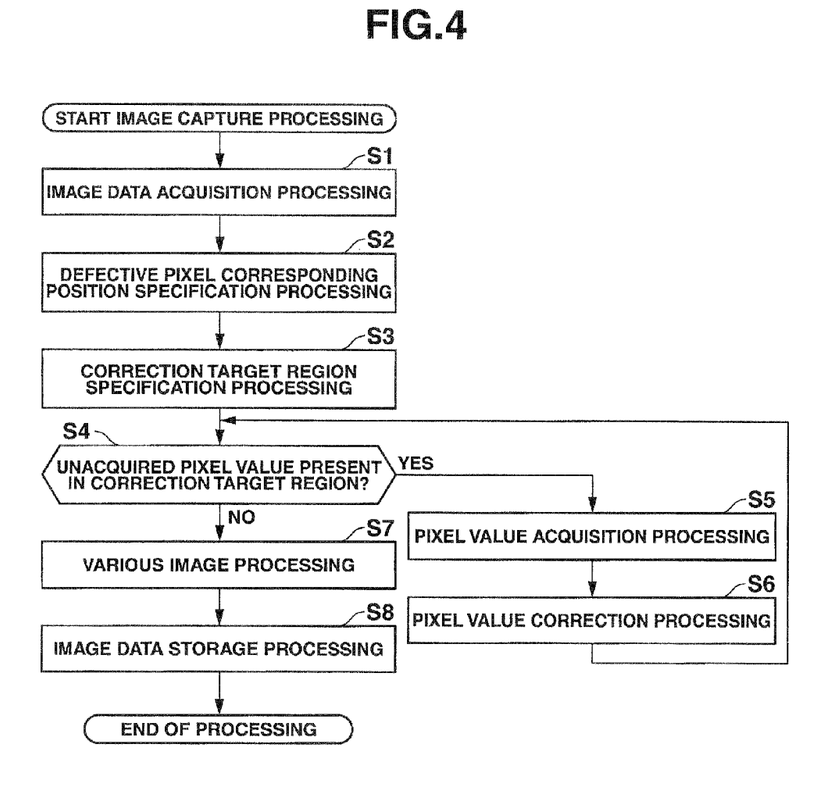
FIG. 4 is a flowchart showing an example of the flow of image capture processing executed by the digital camera of FIG. 2.

FIG. 4 is a flowchart showing an example of the flow of image capture processing. With the present flowchart, only correction based on the weighted average is performed by the correction unit 55. In addition, in the present embodiment, image capture processing starts when a power source (not illustrated) of the digital camera 1 is turned ON, and a predetermined condition is satisfied.

In Step S1, the image acquisition unit 52 in FIG. 2 executes image data acquisition processing.

In other words, under the control of the image controller 51, the image acquisition unit 52 acquires image data outputted from the imaging unit 16, and causes it to be stored in the VRAM.

In Step S2, the position specification unit 53 in FIG. 2 executes defective-pixel corresponding-position specification processing.

In other words, under the control of the image controller 51, the position specification unit 53 specifies the position of a defective pixel for the image data stored in the VRAM in Step S1, based on the detective pixel position list stored in the storage unit 18. Herein, the position specification unit 53 in FIG. 2 sequentially reads the defective pixel position list from the top one by one, and then specifies the position newly read as the position of the defective pixel.

In Step S3, the region specification unit 54 in FIG. 2 executes correction-target-region specification processing.

In other words, the region specification unit 54 specifies a region in which image noise occurs due to a defective pixel in the image data, based on the position specified in Step S2.

In Step S4, the correction unit 55 in FIG. 2 determines whether or not there is a pixel value in the correction target region that has not been acquired by way of the pixel value acquisition processing described later. The correction unit 55 advances the processing to Step S5 in a case of there being a pixel value not having been acquired by way of the pixel value acquisition processing. In addition, the correction unit 55 advances the processing to Step S7 in a case of there not being a pixel value not having been acquired by way of the pixel value acquisition processing, i.e. in a case of the pixel values of all of the pixels included in the correction target region having been acquired.

In Step S5, the correction unit 55 executes pixel value acquisition processing.

In other words, the correction unit 55 acquires, from the correction target region specified in Step S3, one pixel value that still has not been acquired as the pixel value of the attention pixel.

In Step S6, the correction unit 55 executes pixel value correction processing.

In other words, the correction unit 55 specifies a plurality of pixels located at the periphery of the correction target region specified in Step S3, by selecting pixels located in a predetermined range from the position specified in Step S2. Then, the correction unit 55 selects, from the plurality of pixels located at the periphery of the correction target region, pixels to be used in correction of the pixel value acquired in Step S5.

Then, the correction unit 55 performs correction on the pixel value of the attention pixel acquired in Step S5, based on the weighted average of pixels values of the pixels selected. When this processing ends, the processing is returned to Step S4.

In Step S7, the image controller 51 executes various image processing.

In other words, the image controller 51 controls the image processing unit 17 to execute various image processing on the image data for which the pixel values included in the correction target region relating to the positions of all defective pixels have been corrected.

In Step S8, the image controller 51 executes image data storage processing.

In other words, the image controller 51 causes the image data on which various image processing has been executed to be stored in the removable media 31 in Step S8. When this processing ends, the image capture processing ends overall.

Figure 5:
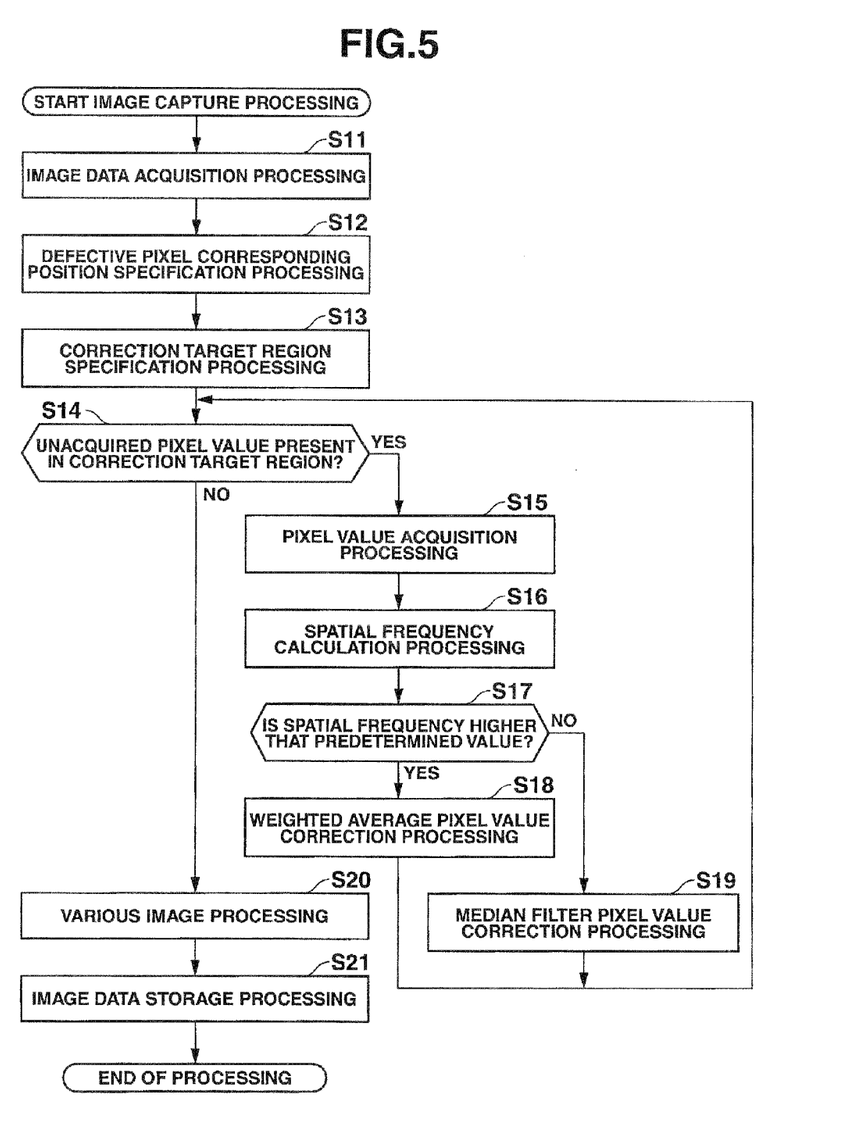
FIG. 5 is a flowchart showing another example of the flow of image capture processing executed by the digital camera of FIG. 2.

FIG. 5 is a flowchart showing another example of the flow of image capture processing. In the present flowchart, only correction based on weighted average and median filter is performed by the correction unit 55. In addition, in the present embodiment, the image capture processing starts when the power source (not illustrated) of the digital camera 1 is turned ON, and a predetermined condition has been satisfied.

The processing of Step S11 to Step S15 is the same processing as the processing of Step S1 to Step S5 in FIG. 4; therefore, explanation thereof will be omitted.

In Step S16, the correction unit 55 executes spatial frequency calculation processing.

In other words, the correction unit 55 performs Fourier transform of the pixel values of a plurality of pixels included in the correction target region, and calculates the spatial frequency of the correction target region.

In Step S17, the correction unit 55 determines whether or not the spatial frequency calculated in Step S16 is higher than a predetermined value. The correction unit 55 advances the processing to Step S19 in a case of this determination being NO, and advances the processing to Step S18 in a case of this processing being YES.

In Step S18, the correction unit 55 executes weighted-average pixel-value correction processing. This processing is the same processing as the processing of Step S6 in the flowchart shown in FIG. 4; therefore, an explanation thereof will be omitted. When this processing ends, the processing is returned to Step S14.

In Step S19, the correction unit 55 executes median-filter pixel-value correction processing.

In other words, the correction unit 55 performs correction, on the pixel value of the attention pixel acquired in Step S15, so as set the intermediate value of the pixel values of the plurality of pixels to be used in correction as the corrected value. When this processing ends, the processing is returned to Step S14.

The processing of Step S20 and Step S21 is the same processing as the processing of Step S7 and Step S8 in the flowchart shown in FIG. 4; therefore, explanation thereof will be omitted.

According to the aforementioned such digital camera 1 of the present embodiment, the position of a defective pixel among a plurality of pixels in image data generated by the imaging unit 16 is specified by the position specification unit 53, a region in which image noise occurs in the image data due to the defective pixel is specified by the region specification unit 54 based on the position specified by the position specification unit 53, and the pixel values of a plurality of pixels included in the region of the image data specified by the region specification unit 54 are corrected by the correction unit 55 based on the pixel values of a plurality of pixels located at the periphery of this region.

It is thereby possible to correction the pixel values related to the region in which this blooming occurs, even in a case of blooming occurring in the imaging element at the periphery of a defective pixel. Consequently, the digital camera 1 can accurately and effectively correct image signals.

In this case, the correction unit 55 corrects the pixel value of each of the plurality of pixels included in the correction target region, based on the weighted average of pixel values of the plurality of pixels located at the periphery of the correction target region.

It is thereby possible to set the degree of influence for pixels near the pixel of the correction target to be large, as well as setting the degree of influence for pixels far from the pixel for the correction target to be small.

At this time, the correction unit 55 causes the weight in the weighted average for each of the pixel values of the plurality of pixels to be used in correction to vary, depending on the position of each of the plurality of pixels included in the correction target region.

It is thereby possible to cause the weight of pixel values to be used in correction to appropriately vary depending on the position of each of the plurality of pixels included in the correction target region.

In this case, the correction unit 55 sets the pixels located at a predetermined range from the position specified by the position specification unit 53 as the plurality of pixels located at the periphery of the correction target region. It is thereby possible to set the region at the periphery of the correction target region centered around the position specified by the position specification unit 53, i.e. position of the defective pixel.

In this case, for each of the plurality of pixels included in the correction target region, the correction unit 55 selects pixels used in the correction of the pixel value from the plurality of pixels at the periphery of this correction target region, depending on the position of each of the pixels to be the correction target. It is thereby possible to select similar color pixels as the pixels used in correction.

In this case, the region specification unit 54 specifies the size of the correction target region based on the position specified by the position specification unit 53 and the state during generation of the image data by the imaging unit 16. More specifically, with the ambient temperature of the imaging elements and the exposure time as the state during generation of the image data, the region specification unit 54 specifies the size of the correction target region, based on the position specified by the position specification unit 53 and the state during generation of the image data. It is thereby possible to specify the size of the correction target region, presuming a region in which blooming happens based on the state during generation of the image data like the ambient temperature of the imaging elements and the exposure time.

In this case, the imaging elements are configured to be CMOS sensors for which the correction target region varies depending on the ambient temperature of these imaging elements and the exposure time. It is thereby possible to perform appropriate correction in a case of using, as the imaging elements, CMOS sensors in which blooming happens.

In this case, the correction unit 55 controls whether or not to perform correction depending on the ambient temperature of the imaging elements and the exposure time. It is thereby possible to determine whether or not blooming is happening based on the ambient temperature of the imaging elements and the exposure time, and then perform correction.

In this case, with the ambient temperature of the imaging elements and the exposure time as the state during generation of image data, the region specification unit 54 specifies the correction target region based on the position specified by the position specification unit and this state during the generation of image data.

It should be noted that the present invention is not to be limited to the aforementioned embodiment, and that modifications, improvements, etc. in a scope that can achieve the object of the present invention are included in the present invention.

In addition, although the image processing device to which the present invention is applied has been explained with the digital camera 1 as an example in the aforementioned embodiment, it is not particularly limited thereto. The present invention can be applied to common electronic equipment having CMOS-type imaging elements, and is widely applicable portable-type personal computers, portable-type navigation devices, portable game machines and the like, for example.

The aforementioned sequence of processing can be made to be executed by hardware, or can be made to be executed by software.

In the case of having the sequence of processing executed by way of software, a program constituting this software is installed from the Internet or a recording medium into the image processing device or a computer or the like controlling this image processing device. Herein, the computer may be a computer incorporating special-purpose hardware. Alternatively, the computer may be a computer capable of executing various functions by installing various programs, for example, a general-purpose personal computer.

The recording medium containing such a program is configured not only by the removable media 31 that is distributed separately from the main body of the device in order to provide the program to the user, but also is configured by a recording medium provided to the user in a state incorporated in the main body of the equipment in advance, or the like. The removable media 31 is configured by a magnetic disk (including a floppy disk), optical disk, magneto-optical disk, and the like, for example. The recording medium provided to the user in a state incorporated in the main body of the equipment in advance is configured by the ROM 12 in which the program is recorded, a hard disk included in the storage unit 18, or the like.

It should be noted that the steps describing the program recorded in the recording medium naturally include only processing performed chronologically in the described order, but is not necessarily processed chronologically, and also includes processing executed in parallel or separately.

What is claimed is:

1. An image processing device, comprising:
   an imaging unit that has an imaging element including a plurality of pixels, and that generates a pixel value for each of the plurality of pixels as image data;
   a position specification unit that specifies a position of a defective pixel among the plurality of pixels, in the image data generated by the imaging unit;
   a first region specification unit that specifies one correction target region in the image data, the correction target region being based on the position specified by the position specification unit, and the correction target region including a plurality of pixels to be correction target pixels, each correction target pixel having image noise occurring due to the defective pixel;
   a second region specification unit that specifies one peripheral region, the peripheral region being located at a predetermined range from the position specified by the position specification unit and adjacent outside relative to a boundary of the correction target region by a distance of a predetermined number of pixels, and the peripheral region including a plurality of pixels to be used in correction; and a correction unit that (i) selects, for each of the correction target pixels, a pixel to be used in correction of a pixel value of the correction target pixel from among the plurality of pixels located in the peripheral region, the pixel to be used in the correction being selected based on the position of the correction target pixel, and (ii) corrects the pixel value of the correction target pixel based on a pixel value of the selected pixel to be used in the correction.

2. The image processing device according to claim 1, wherein the first region specification unit specifies a size of the correction target region based on the position specified by the position specification unit and a state during generation of the image data by the imaging unit.

3. The image processing device according to claim 1, wherein the correction unit controls whether to perform correction based on an ambient temperature of the imaging element and an exposure time.

4. The image processing device according to claim 3, wherein the imaging element is a CMOS sensor for which the region varies based on the ambient temperature and the exposure time.

5. The image processing device according to claim 3, wherein the first region specification unit specifies the correction target region based on the position specified by the position specification unit and a state during generation of the image data, the state during generation of the image data being the ambient temperature of the imaging element and the exposure time.

6. The image processing device according to claim 1, wherein the correction unit (i) selects, for each of the correction target pixels, a plurality of pixels to be used in the correction of the pixel value of the correction target pixel from among the plurality of pixels located in the peripheral region, the plurality of pixels to be used in the correction being selected based on the position of the correction target pixel, and (ii) corrects the pixel value of the correction target pixel based on a weighted average of pixel values of the selected plurality of pixels to be used in the correction.

7. The image processing device according to claim 6, wherein the correction unit performs control to vary a combination of weights in the weighted average of the pixel values of the selected plurality of pixels to be used in the correction based on the position of the correction target pixel.

8. An image processing method executed by an image processing device having an imaging element including a plurality of pixels, the method comprising:

generating, as image data, a pixel value of each of the plurality of pixels;

specifying a position of a defective pixel among the plurality of pixels, in the generated image data;

specifying one correction target region in the image data, the correction target region being specified based on the specified position of the detective pixel and including a plurality of pixels to be correction target pixels, each correction target pixel having image noise occurring due to the defective pixel;

specifying one peripheral region, the peripheral region being located at a predetermined range from the specified position of the defective pixel and adjacent outside relative to a boundary of the specified correction target region by a distance of a predetermined number of pixels, the peripheral region including a plurality of pixels to be used in correction; and performing the correction by (i) selecting, for each of the correction target pixels, a pixel to be used in correction of a pixel value of the correction target pixel from among the plurality of pixels located in the peripheral region, the pixel to be used in the correction being selected based on the position of the correction target pixel, and (ii) correcting the pixel value of the correction target pixel based on a pixel value of the selected pixel to be used in the correction.

9. A non-transitory computer readable recording medium having a program stored thereon that is executable to control a computer of an image processing device having an imaging element including a plurality of pixels to perform functions comprising:

generating, as image data, a pixel value of each of the plurality of pixels;

specifying a position of a defective pixel among the plurality of pixels, in the generated image data;

specifying one correction target region in the image data, the correction target region being specified based on the specified position of the detective pixel and including a plurality of pixels to be correction target pixels, each correction target pixel having image noise occurring due to the defective pixel;

specifying one peripheral region, the peripheral region being located at a predetermined range from the specified position of the defective pixel and adjacent outside relative to a boundary of the specified correction target region by a distance of a predetermined number of pixels, the peripheral region including a plurality of pixels to be used in correction; and performing the correction by (i) selecting, for each of the correction target pixels, a pixel to be used in correction of a pixel value of the correction target pixel from among the plurality of pixels located in the peripheral region, the pixel to be used in the correction being selected based on the position of the correction target pixel, and (ii) correcting the pixel value of the correction target pixel based on a pixel value of the selected pixel to be used in the correction.

* * * * *